United States Patent Office 3,518,031
Patented June 30, 1970

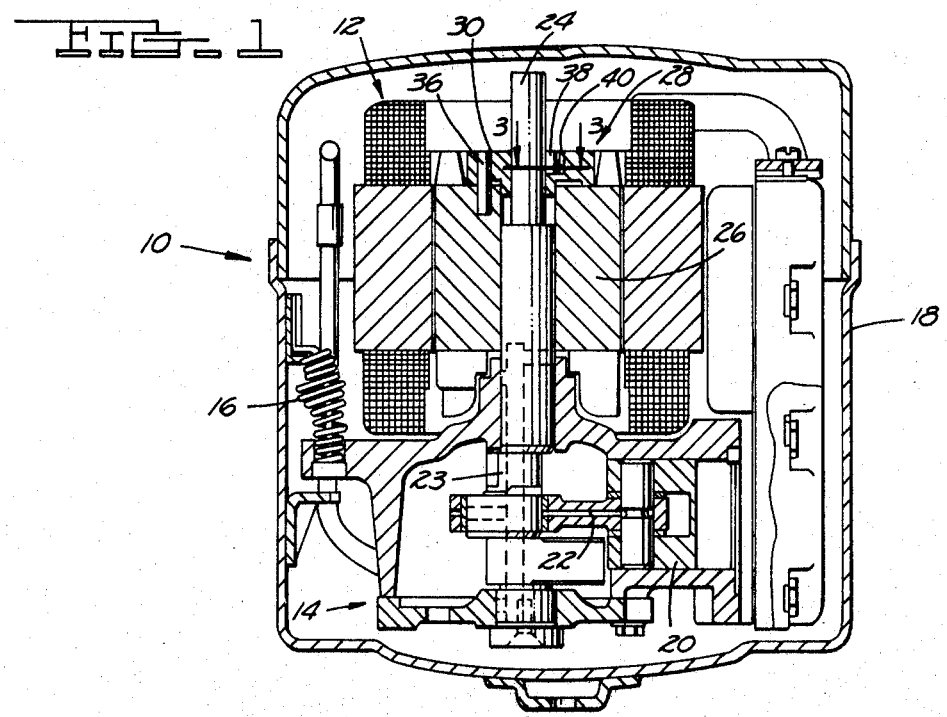
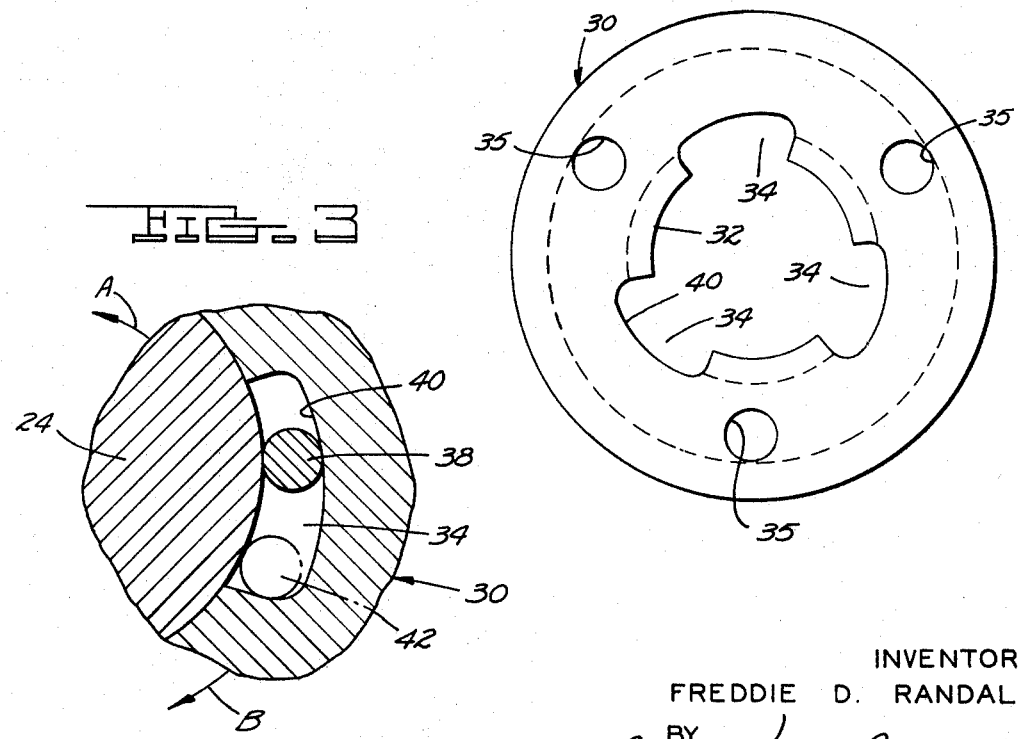

3,518,031
MOTOR-COMPRESSOR UNIT
Freddie D. Randall, Tecumseh, Mich., assignor to Tecumseh Products Company, Tecumseh, Mich., a corporation of Michigan
Filed July 18, 1968, Ser. No. 745,797
Int. Cl. F04b 35/04, 39/00; F16d 35/04
U.S. Cl. 417—319                                    9 Claims

ABSTRACT OF THE DISCLOSURE

A hermetic motor-compressor unit with an overriding or one-way clutch unidirectionally coupling the motor rotor with a drive shaft of the compressor. The rotor is journalled for free rotation on the compressor crankshaft and the overriding clutch has an apertured plate encircling the shaft and mounted on the rotor. The plate has a plurality of cam pockets adjacent to the shaft each carrying a clutch roller. Relative rotational movement of the plate and shaft in one direction urges the rollers into locking engagement with the shaft so that the shaft and plate rotate as a single unit. Relative rotational movement of the plate and shaft in the opposite direction disengages or unlocks the rollers so that the plate and shaft can rotate independently of each other. Thus the mass of the moving parts of the motor-compressor unit set into oscillatory, vibration-inducing motion at shutdown is considerably reduced to thereby provide a unit which reduces shutdown vibration and noise.

---

This invention relates to improvements in hermetically sealed resiliently mounted motor-compressor units.

In hermetic motor-compressor units the rotor of the electric motor is usually directly connected to the crankshaft as by being fixed thereto for bidirectional rotation therewith and hence for rotation with the remaining permanently coupled moving parts of the motor-compressor drive train, namely the connecting rod and piston of the compressor. Due to the relatively large mass of the rotor as well as that of the crankshaft, connecting rod and piston, there is considerable momentum tending to continue the reciprocation of the piston after the electric motor is de-energized by being disconnected from its power source by the thermostat or other control. As this combined mass decelerates, it reaches a point where the resistance of the gas being compressed is sufficient to halt the forward motion of the piston as it approaches but before it reaches top dead center. The partially compressed gas then urges or kicksback the piston in the opposite direction, thereby reversing the direction of rotation of the crankshaft and rotor of the electric motor and thus initiating a period of oscillation of these drive train parts which creates a substantial amount of vibration and noise in the unit which is accentuated by the resilient suspension of the motor-compressor within its hermetic casing. In some cases the shutdown "shudder" may even result in the motor-compressor unit striking the wall of the housing or casing.

A principal object of this invention is to provide a hermetic motor-compressor unit with substantially improved anti-vibration and anti-noise shutdown characteristics.

Another object of this invention is to provide a motor-compressor unit of the above character by adding only a few relatively simple component parts of economical construction and assembly.

Other objects and features of this invention will become apparent from the following detailed description and accompanying drawings in which:

FIG. 1 is a vertical center section of a hermetic motor-compressor unit of the invention illustrating an overriding clutch assembly connecting the rotor of the electric motor to the drive shaft of the piston compressor.

FIG. 2 is a plan view of a cam plate of the clutch assembly of FIG. 1 shown by itself.

FIG. 3 is a sectional view on line 3—3 of FIG. 1 showing the locked or coupled position of the rollers of the clutch assembly of FIG. 1.

Referring to FIG. 1, one form of a hermetic motor-compressor unit, designated generally as 10, is illustrated which is a piston-type compressor such as that commonly used in home refrigerators, air conditioners and similar refrigeration equipment. Unit 10 has an electric motor 12, which may be of the conventional capacitance or resistance start, two or four pole induction type, attached to a piston compressor 14 and the unit is resiliently suspended by springs 16, usually three in number, in a two-part casing 18 which totally encloses and hermetically seals motor 12 and compressor 14. Compressor 14 has a piston 20, connecting rod 22, and a crankshaft 23 integral with the motor drive shaft 24 which is journalled in the compressor frame and extends vertically through motor 12. A rotor 26 of motor 12 is journalled for free rotation on crankshaft 24 and is selectively connected to shaft 24 (coupled in only one direction of rotation of the shaft relative to the rotor) by an overriding or one-way clutch assembly designated generally as 28.

As explained hereafter, clutch 28 connects rotor 26 to shaft 24 in such a manner that motor-compressor unit 10 has substantially improved anti-vibration and anti-noise shutdown characteristics. As shown in FIGS. 1, 2 and 3, clutch assembly 28 comprises a generally annular plate or disc 30 with a central aperture 32 and three cam pockets 34 circumscribing a portion of shaft 24. Holes 35 are formed in disc 30 through which pins 36 are inserted and pressed into the rotor to mount plate 30 on the upper end of rotor 26 with the upper end of shaft 24 extending freely through aperture 32. Rollers 38 are received in cam pockets 34 so that they extend generally vertically parallel to shaft 24. As shown in FIG. 3, each pocket 34 is formed with a cam surface 40 which is shaped so that rotation of disc 30 relative to shaft 24 in one direction as indicated by arrows A and B in FIG. 3 urges rollers 38 into engagement with shaft 24. Counter rotational relative movement of disc 30 and shaft 24 allows rollers 38 to become disengaged as indicated by the broken line pin position 42 shown in FIG. 3. When initial relative rotary motion of discs 30 and shaft 24 urges rollers 38 into conjoint engagement with shaft 24 and surface 40, the disc and shaft become locked together so that further relative rotation ceases and disc 30 and shaft 24 thereupon rotate as a single unit in the direction of whichever of these parts is the driving member. Clutch 28 is arranged so that forward rotation of rotor 26 drives compressor 14 in one direction, herein designated its forward direction, through clutch 28 and if compressor 14 is driven in reverse by the aforementioned gas kickback action, it can drive rotor 26 in reverse.

In operation it is theorized that on shutdown of motor 12 rotor 26 is brought to a stop by the resistance to reciprocation of piston 20 in the forward direction so that rotation of rotor 26 ceases simultaneously with cessation of rotation of the drive shaft 24 in the forward direction. This occurs because clutch 28 couples rotor 26 to shaft 24 when the rotor tries to overrun the shaft 24 in the forward direction. Hence rotor 26 cannot come to a stop in the forward direction of rotation after drive shaft 24 has been decelerated to a halt in the forward compression direction. At some point in time subsequent to de-energization of motor 12, after the drive train has been decelerated by the resistance to the pumping work of the compressor, the resistance of the partially compressed gases in compressor 14 to the compression stroke of the piston will become so great that it will overcome the remaining momentum of rotor 26, shaft 23–24, connecting rod 22 and piston 20 and will bring forward motion of this train to a halt before the piston reaches top dead center on its compression stroke. The partially compressed gases will then urge the piston toward bottom dead center, thereby causing the piston to drive shaft 23–24 in a reverse direction of rotation. The reversed rotation of shaft 24 will impart a reversed rotary motion to rotor 26 of motor 12 because clutch 28 will remain locked up since the inertial resistance to acceleration of rotor 26 in the reverse direction produces a tendency toward relative rotation of shaft 24 and disc 30 which is still the same as indicated by arrows A and B in FIG. 3.

Since rotor 26, shaft 23–24, connecting rod 22 and piston 20 did not have sufficient kinetic energy to overcome the resistance of the partially compressed gas on the compression stroke, and since a portion of that kinetic energy has been transferred to the rotor by imparting reverse motion to it, the shaft, connecting rod and piston will not have sufficient kinetic energy when re-accelerated in reverse to overcome the resistance of the gas that is being compressed by movement of the piston toward top dead center in the reverse direction. Hence after passing through bottom dead center in reverse, the piston will be brought to a halt in the reverse direction before reaching top dead center, at some point short of its travel when first halted in the forward direction, and then the compressed gas will drive the piston in its forward direction, thus reversing its direction of travel and urging it toward bottom dead center. This resumption of movement of the piston and shaft 23–24 in the forward direction will reverse the relative direction of rotation of disc 30 and shaft 24, thereby causing clutch 28 to uncouple rotor 26 from shaft 24 so that rotor 26 will continue to rotate in the reverse direction. Piston 20 in its travel in the forward direction will pass through bottom dead center and begin a compression stroke, but the partially compressed gases will again halt the piston and shaft 23–24 before the piston reaches top dead center on this second forward stroke. Upon the piston once again being kicked back in reverse, shaft 23–24 will be recoupled to rotor 26 by clutch 28 if shaft 23–24 attempts to overrun rotor 26, which will either be traveling in the reverse direction or will have come to a stop. However, in most hermetic compressors the mass of rotor 26 is much greater than that of shaft 23–24, rod 22 and piston 20, on the order of 3:1. Hence once rotor 26 is accelerated in reverse as a result of the first kickback of the piston, it will continue rotating in reverse, and will decelerate more slowly than the piston-shaft train. Therefore, the piston and shaft train probably will not thereafter "catch up" with rotor 26 during the second and subsequent reverse cycles of oscillation of the train. If the piston-shaft train should catch up to rotor 26 on such reverse swings, it will merely serve to transfer kinetic energy from the piston-shaft train to rotor 26, tending to continue reverse rotation of rotor 26 while further damping oscillation of the piston-shaft train.

In this manner the compressor crankshaft 23 with its common drive shaft 24, rod 22 and piston 20 will continue to oscillate through an arc of less than 360°, in successively shorter swings, until the kinetic energy of the train is dissipated. Thus, the overriding coupling 28 operates to provide (1) a smaller mass to be oscillated by the kickback of piston 20 because rotor 26 is decoupled once it has been reversed and can no longer operate as an oscillating flywheel, (2) a means by which a portion of the kinetic energy of the crankshaft, connecting rod and piston are transferred to the rotor where the energy is dissipated without oscillation, and (3) a gyroscopic effect due to the continuous rotation of rotor 26 in the reverse direction during oscillation of the piston-shaft train which tends to stabilize the resiliently mounted motor compressor unit in its shell. All three of these effects are believed to contribute to the reduction of shutdown vibration and noise. However, regardless of the theoretical explanation, it has been empirically determined that a hermetic compressor unit equipped with an overriding clutch in accordance with this invention does provide a hermetic motor-compressor unit with substantially improved anti-vibration and anti-noise shutdown characteristics.

It is also to be understood that similar results will be obtained in the well-known rotary type (either fixed or moving vane) hermetic compressors when equipped with a one-way clutch in accordance with the present invention, and therefore such units are to be considered within the scope of the present invention.

Further, the above results will also be obtained in those applications where the rotor upon motor de-energization decelerates in the forward direction and comes to a halt before the drive train.

What is claimed is:

1. Motor-compressor apparatus which comprises:
 (a) a compressor with a drive shaft rotatable in a forward direction to drive the compressor in its forward direction and capable of being rotated in a reverse direction by the compressor at shutdown,
 (b) an electric motor with a rotor rotatable in a forward direction for rotatably driving said drive shaft in said forward direction and capable of being rotated in a reverse direction by said drive shaft, and
 (c) a one-way clutch operably connected between said rotor and drive shaft such that said clutch is operable to couple said rotor to said drive shaft when said rotor attempts to overrun said drive shaft in the forward direction of rotation of said rotor and operable to decouple said drive shaft from said rotor when said rotor attempts to overrun said drive shaft in the reverse direction of rotation of said drive shaft.

2. Motor-compressor apparatus as defined in claim 1 in which said compressor is a reciprocating piston-type compressor.

3. Motor-compressor apparatus as defined in claim 1 which also comprises a base and resilient means mounting said electric motor and said compressor on said base.

4. In a hermetic electric motor-compressor of the type in which the motor-compressor unit is resiliently mounted in a hermetic casing, the improvement which comprises an overriding clutch operably connecting the motor to the compressor such that the motor will drive the compressor in only one direction of rotation of the motor, said motor-compressor unit including a motor rotor and a motor-compressor drive shaft extending coaxially of said rotor, said rotor being journalled for free rotation about said drive shaft, and wherein said clutch is connected between said rotor and said drive shaft, and clutch coupling said rotor to said drive shaft when the motor attempts to overrun the compressor in one direction of rotation and decoupling said drive shaft from the rotor when said rotor attempts to overrun said drive shaft in the direction of rotation of said rotor opposite to said one direction.

5. The improvement in an electric motor-compressor unit as defined in claim 4 in which said compressor comprises a reciprocating piston-type compressor.

6. The improvement in an electric motor-compressor unit as defined in claim 5 in which said compressor has a single piston and a generally vertically extending crankshaft.

7. The motor-compressor unit as defined in claim 4 in which said overriding clutch comprises:
 (a) a plate with an aperture receiving a portion of said drive shaft therethrough, said plate being connected to said rotor and having at least one cavity adjacent to said drive shaft formed with a cam surface therein, and (b) cam means in said cavity engageable with said cam surface, said cam surface being inclined with respect to the surface of said shaft such that said cam means is urged into conjoint engagement with said cam surface and said shaft when said plate attempts to overrun said shaft in said one direction of rotation, and such that said cam means is released from said engagement when said plate attempts to overrun said shaft in a direction opposite to said one direction of rotation.

8. The motor-compressor unit as defined in claim 7 in which said cam means comprises a roller.

9. The motor-compressor unit as defined in claim 8 in which said drive shaft extends generally vertically, said clutch is connected to the upper end of said rotor and said rotor is disposed above said compressor, and said mounting means is connected to said motor and said compressor in an area generally in line with the lower end of said rotor adjacent to said compressor.

References Cited

UNITED STATES PATENTS

| | | | |
|---|---|---|---|
| 512,538 | 1/1894 | Clark et al. | 192—45 XR |
| 2,150,347 | 3/1939 | Sorensen | 230—58 XR |
| 3,066,857 | 12/1962 | McCloy | 230—232 |
| 3,291,383 | 12/1966 | Butts | 230—139 |

ROBERT M. WALKER, Primary Examiner

U.S. Cl. X.R.

192—45; 417—415, 902